US007009527B2

(12) United States Patent
Seo

(10) Patent No.: US 7,009,527 B2
(45) Date of Patent: Mar. 7, 2006

(54) CONTROL SYSTEM FOR SUPPLING POWER BY POWER LINE COMMUNICATION

(75) Inventor: Moon-Soo Seo, Kyunggi-do (KR)

(73) Assignee: Doo Won Co., Ltd, Kyunggi-Do (KR)

( * ) Notice: Subject to any disclaimer, the term of this patent is extended or adjusted under 35 U.S.C. 154(b) by 189 days.

(21) Appl. No.: 10/466,577

(22) PCT Filed: Nov. 22, 2001

(86) PCT No.: PCT/KR01/02014

§ 371 (c)(1),
(2), (4) Date: Jul. 15, 2003

(87) PCT Pub. No.: WO03/044924

PCT Pub. Date: May 30, 2003

(65) Prior Publication Data

US 2004/0239520 A1 Dec. 2, 2004

(51) Int. Cl.
*G08C 19/00* (2006.01)

(52) U.S. Cl. .......................... 340/825.71; 340/310.01; 340/825.72

(58) Field of Classification Search ........... 340/310.01, 340/310.08, 538, 3.7, 3.71, 825.71, 825.72; 375/211, 214, 316, 352
See application file for complete search history.

(56) References Cited

U.S. PATENT DOCUMENTS

| | | | | |
|---|---|---|---|---|
| 4,755,792 | A | 7/1988 | Pezzolo et al. | 340/538 |
| 5,570,085 | A * | 10/1996 | Bertsch | 340/3.54 |
| 5,903,594 | A | 5/1999 | Saulnier et al. | 375/200 |
| 5,905,442 | A * | 5/1999 | Mosebrook et al. | 340/3.7 |
| 6,441,723 | B1 * | 8/2002 | Mansfield et al. | 340/310.01 |
| 2003/0043027 | A1 * | 3/2003 | Carson et al. | 340/310.01 |

* cited by examiner

*Primary Examiner*—Thomas Mullen
(74) *Attorney, Agent, or Firm*—Fredrikson & Byron, PA

(57) ABSTRACT

The power supply control system using PLC includes a repeater for recognizing a remote control signal transmitted by a remote control signal transmitter and an ID number of a corresponding electronic equipment to remote control signal transmitter and an ID number of a corresponding electronic equipment to remotely turn on/off at least one of many electronic equipments, a power line signal transmitter for converting the ID number and the remote control signal into a data signal and interfacing with a power line signal of AC power to transmit the data signal, a power line signal controller having a PLC unit for isolating the data signal from the power line signal of AC power and converting the data signal into a digital signal, and a relay integrated with the controller in the electronic equipment to control a power source toward the electronic equipment by connecting/disconnecting a power source terminal to/from a load terminal by control of the controller and connected to the PLC unit.

12 Claims, 8 Drawing Sheets

200
20
22
SERVER
RECEIVING TERMINAL
21
10
40
POWER LINE SIGNAL TRAMSMITTER
80
50
30
80
50
30
80
50
30

100
PLC UNIT
PLC UNIT
PLC UNIT
4
5
6
POWER LINE SIGNAL TRANSMITTER
3
2
SERVER
RECEIVING TERMINAL
1

50
70
60
80
71
72
73
61
62
63
MICROPROCESSOR
64
BUFFER
65
DRIVER
66

CONTROL SYSTEM FOR SUPPLING POWER BY POWER LINE COMMUNICATION

TECHNICAL FIELD

The present invention relates to a power supply control system for remotely controlling an on/off operation of electronic equipment by use of Power Line Communication (PLC), and more particularly to a power supply control system having a configuration which may be easily installed to electronic equipment at a reduced manufacturing cost.

BACKGROUND ART

Generally, Power Line Communication (PLC) is the latest technique transmitting voice or data at a rapid speed through a power line in a house, an office, a building, a factory and so on. The PLC may be applied to various fields such as superhigh-speed Internet communication, Internet phone, home networking system, home automation and remote metering system just by connecting a plug of a computer to a power source without using LAN or a telephone.

Among them, the automation system using PLC connects various electronic equipments such as TV, audio, refrigerator, washer, boiler and lamp/heating devices as well as information equipments such as PC, notebook and PDA to a network through an electric outlet. Thus, the home automation system may remotely control an on/off operation or operating states of various electronic equipments together with data transmission between information terminals.

FIG. 1 is a block diagram showing an example of a conventional power supply control system using PLC.

Referring to FIG. 1, the conventional power supply control system 100 using PLC includes a repeater 2 for recognizing a remote control signal transmitted from a predetermined control signal transmitter 1 and an ID number of an electronic equipment corresponding to the remote control signal, a power line signal transmitter 3 for converting the ID number of the electronic equipment and the remote control signal recognized by the repeater 2 into a predetermined data signal and interfacing with a power line signal of AC power to transmit the data signal, and a PLC unit 6 for comparing the data signal with the ID number transmitted from the power line signal transmitter 3 and controlling the operation of a relay 5 included in each equipment to selectively cut off the power supplied to the electronic equipment.

In the conventional power supply control system 100, the relay 5 for controlling power supply is included in each electronic equipment, and the PLC unit 6 is installed out of the electronic equipment or separately from the electronic equipment, thereby causing troublesomeness in handling a lead wire for connecting the relay 5 to the PLC unit 6. In addition, since it is required to mount the relay 5 in the electronic equipment 4 and install the PLC unit 6 separately, the conventional power supply control system 100 is complicated to install, thus results in increase of the cost required for an electronic equipment adopting the system.

DISCLOSURE OF INVENTION

Therefore, an object of the present invention is to provide a power supply control system using power line communication in which a PLC unit is included in electronic equipment with being detachably combined to a relay, thereby enabling easy installation at a relatively lower cost.

In order to accomplish the above object, there is provided a power supply control system using power line communication, which includes a repeater for recognizing a remote control signal transmitted by a predetermined remote control signal transmitter and an ID number of an electronic equipment corresponding to the remote control signal in order to remotely turn on/off at least one electronic equipment selected among a plurality of electronic equipments; a power line signal transmitter for converting the ID number of the electronic equipment and the remote control signal recognized by the repeater into a predetermined data signal, and interfacing with a power line signal of AC power to transmit the converted data signal; a power line signal controller having a PLC (Power Line Communication) unit for isolating the data signal transmitted by the power line signal transmitter from the power line signal of AC power, and converting the data signal into a digital signal; and a relay integrated with the power line signal controller and included in the electronic equipment so as to control a power source supplied to the electronic equipment by connecting or disconnecting a power source terminal to/from a load terminal under the control of the power line signal controller, the relay being connected to the PLC unit through a contactor.

In the power supply control system using power line communication of the present invention, it is preferable that the power line signal controller is detachably combined to the relay by male-female engagement.

In the power supply control system using power line communication of the present invention, the power line signal controller may further include a driving unit for filtering and rectifying the AC power supplied through the power line and then supplying constant voltages of 5V and 24V to the PLC unit and the relay respectively in order to drive the PLC unit and the relay.

In the power supply control system using power line communication of the present invention, the driving unit preferably includes a filter for dropping the AC power applied from the power line to a constant voltage corresponding to a driving power of the PLC unit and the relay; a rectifier for rectifying the dropped voltage to be output in a DC power; and a regulator for supplying driving powers of 5V and 24V to the PLC unit and the relay by outputting the DC power rectified by the rectifier as a DC signal approximate to a sine wave.

In the power supply control system using power line communication of the present invention, the PLC unit preferably includes a Low Pass Filter (LPF) for filtering the data signal from the power line signal of AC power interfaced with the data signal transmitted from the power line signal transmitter; an amplifier for amplifying the signal filtered by the LPF; an A/D converter for coding the analog signal amplified by the amplifier into a digital signal; a microprocessor for analyzing the ID number of the electronic equipment and the control data signal coded by the A/D converter; a buffer for configuring a data path so as to output the ID number and the control data signal analyzed by the microprocessor; and a driver for providing the ID number and the control data signal buffered by the buffer as an on/off pulse signal so that the power source terminal and the load terminal of the relay are selectively connected or disconnected.

In the power supply control system using power line communication of the present invention, the relay preferably includes a bobbin coil having an open circuit coil for applying a predetermined current upward and a loop circuit coil for applying a predetermined current downward according to the on/off pulse signal provided from the driver of the PLC unit, the bobbin coil being spirally wound so that the open circuit coil and the loop circuit coil give electromagnetic forces to opposite directions by the current selectively applied; a bar-shaped mover inserted into the bobbin coil to be movable vertically by the electromagnetic force applied to the bobbin coil; and an armature installed to the mover so as to connect or disconnect the power source terminal to/from the load terminal by the movement of the mover.

In the power supply control system using power line communication of the present invention, the pilot unit preferably includes a fixed pilot contactor installed on a path of the mover; and a movable pilot contactor installed to the mover in correspondence to the armature so as to selectively contact with the fixed pilot contactor according to the movement of the mover.

In the power supply control system using power line communication of the present invention, the pilot unit preferably includes a fixed pilot contactor installed on a path of the mover; and a movable pilot contactor installed to the mover in correspondence to the amateur so as to selectively contact with the fixed pilot contactor according to the movement of the mover.

Therefore, since the power supply control system using PLC according to the present invention has a configuration in which the power line signal controller is detachably combined to the relay in electronic equipment, it can be easily installed to an electronic equipment, thereby improving production efficiency and reducing a manufacturing cost.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, preferred embodiments of the present invention will be described in detail, particularly with reference to the accompanying drawings for helping better understanding. However, it should be understood that the embodiments of the invention may be changed in various ways, and the scope of the invention is not limited to the embodiments explained below. The embodiments of the invention are provided for the purpose of giving more definite and easier explanation to those skilled in the art.

Figure 1:
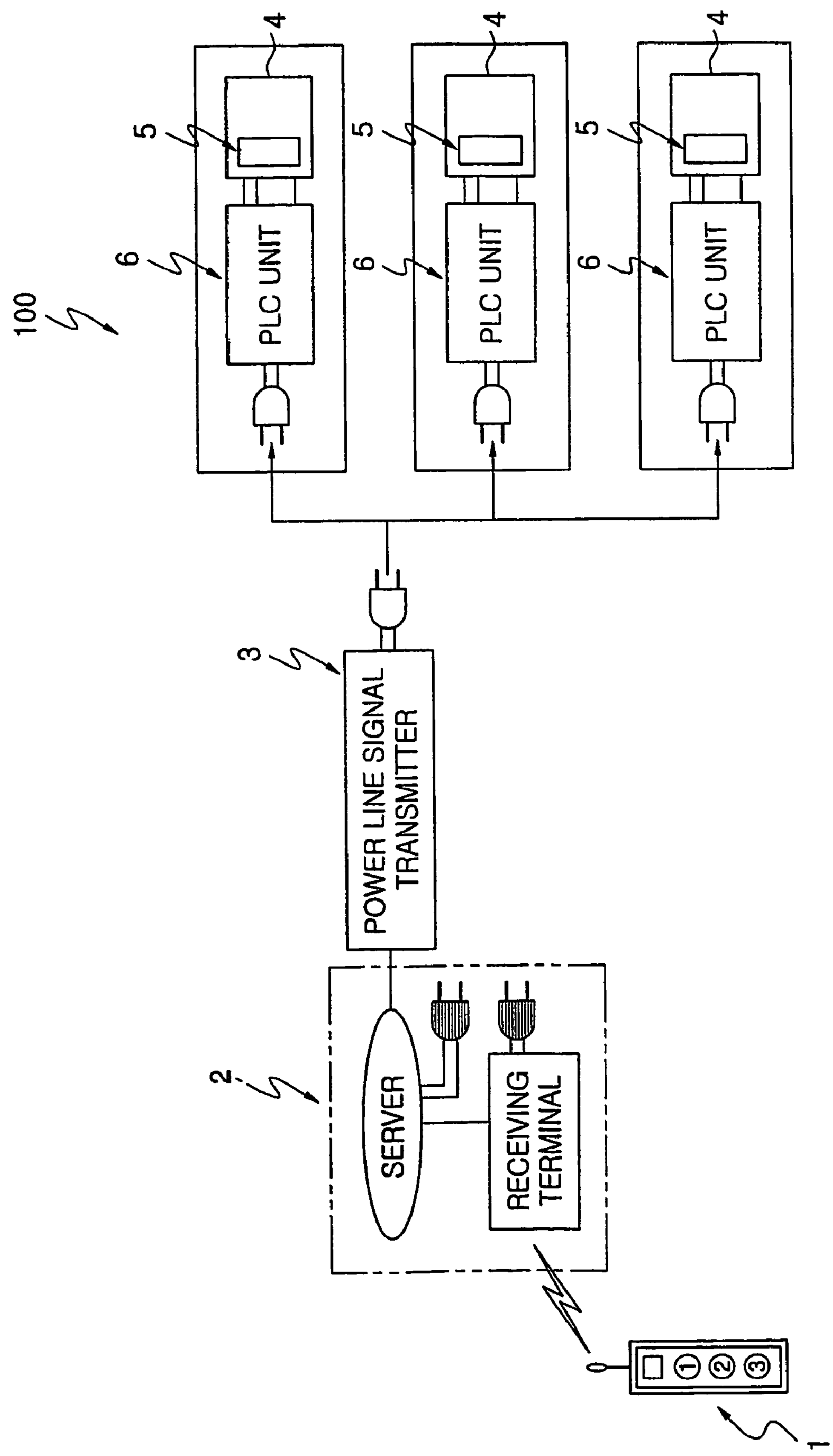
FIG. 1 is a block diagram showing an example of a conventional power supply control system using Power Line Communication (PLC)
Figure 2:
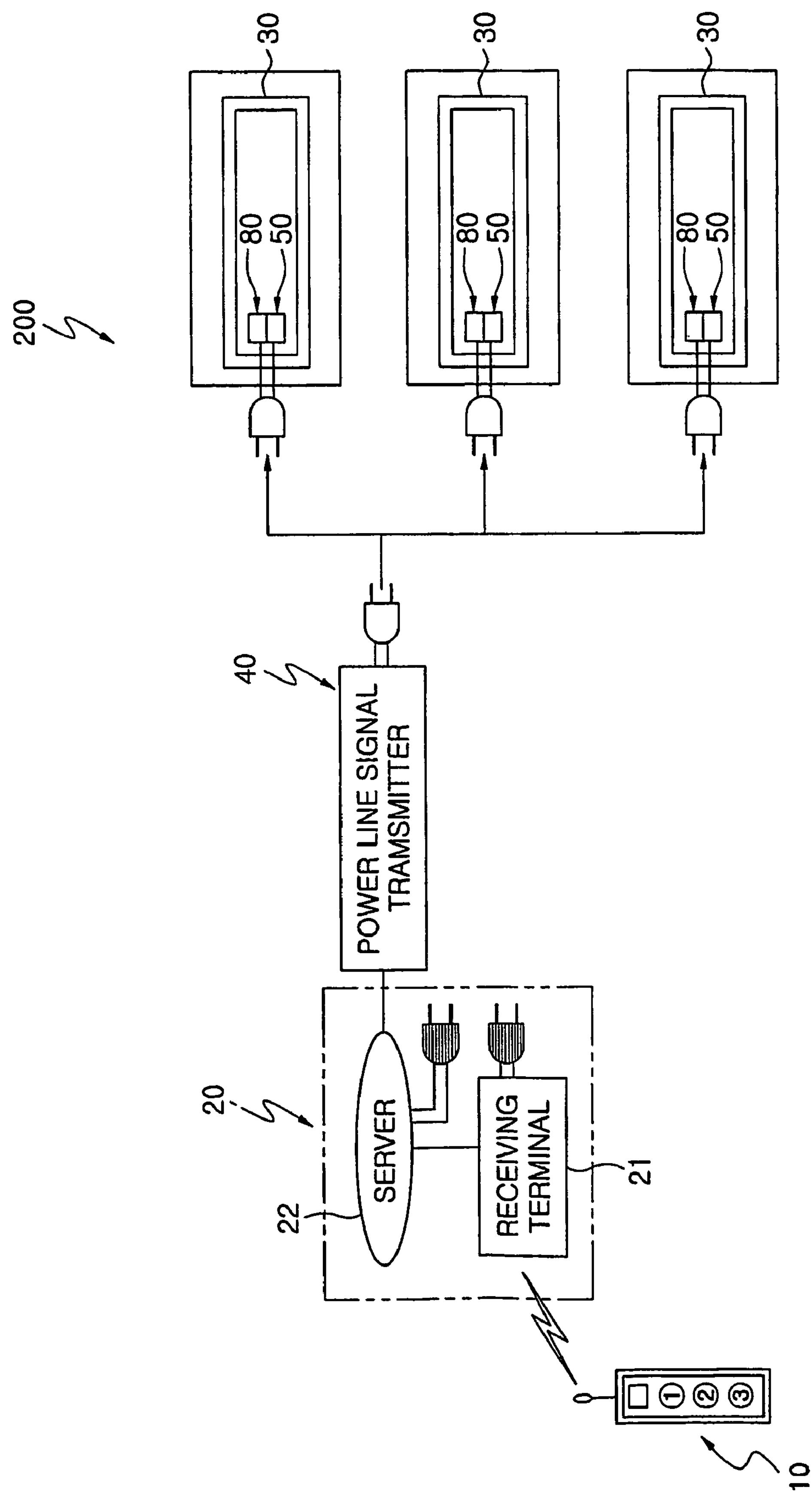
FIG. 2 is a schematic block diagram showing a power supply control system using PLC according to a preferred embodiment of the present invention.

FIG. 2 is a block diagram schematically showing a power supply control system using Power Line Communication (PLC) according to a preferred embodiment of the present invention.

Referring to FIG. 2, the power supply control system 200 of the present invention adopts Power Line Communication (PLC) for taking a predetermined data signal on a sine wave of 60 Hz, which is AC power of AC 110V/220V, and transmitting the sine wave through a power line. By using the transmission of data signals, this power supply control system 200 may remotely control a on/off operation of various equipments: temperature conditioning device such as boiler, heater and cooler; household electrical appliances such as TV, refrigerator, audio and washer; lamp/heating devices; and factory facilities.

For this purpose, the power supply control system 200 includes a repeater 20 for recognizing a remote control signal transmitted by a remote control signal transmitter 10 and an ID number of an electronic equipment 30 corresponding to the remote control signal in order to remotely control at least one electronic equipment selected among a plurality of electronic equipments to be turned on/off, a power line signal transmitter 40 for converting the ID number of the electronic equipment 30 and the remote control signal recognized by the repeater 20 into a predetermined data signal and interfacing with a power line signal of AC power to transmit the converted data signal, a power line signal controller 50 for isolating the data signal transmitted by the power line signal transmitter 40 from the power line signal of AC power and converting the data signal into a digital signal, and a relay 80 integrated with the power line signal controller 50 and included in the electronic equipment so as to control a power supplied to the electronic equipment 30 by connecting or disconnecting a power source terminal 85 (see FIG. 5) to/from a load terminal 86 (see FIG. 5) under the control of the power line signal controller 50. The power line signal controller 50 is included in the electronic equipment 30 together with the relay 80.

The remote control signal transmitter 10 is provided with a remote control for local area communication in order to send a predetermined wireless remote control signal to a local area in a house or a factory. The remote control for local area communication may send an ID number allocated to each electronic equipment 30 and a remote control signal for controlling an on/off operation of the corresponding electronic equipment 30 to the repeater 20.

Alternatively, the remote control signal transmitter 10 may send the remote control signal to the repeater 20 through an outside network such as a local area network such as Home LAN or the Internet or also send the remote control signal to the repeater 20 through a wire/wireless phone, not limited to the remote control for local area communication.

The repeater 20 includes a receiving terminal 21 for receiving the ID number of the electronic equipment and the remote control signal sent from the remote control signal transmitter 10, and a home automation server 22 for storing the ID number of the electronic equipment 30 received through the receiving terminal 21 and recognizing the ID number and the remote control signal corresponding to the ID number.

The receiving terminal 21 preferably adopts a well-known BT(Bluetooth) access point applied to the local area network.

The server 22 sets an ID number allocated to each of electronic equipments 30 and selectively recognizes a control signal for each ID number. In other words, the server 22 compares an ID number(s) of at least one electronic equipment 30 received through the receiving terminal 21 with a plurality of preset ID numbers, and then selectively recognizes a control signal for the ID number.

The receiving terminal 21 and the server 22 are preferably interconnected using a common RS-232 communication port so as to interchange information such as an ID number of electronic equipment and a remote control signal.

The power line signal transmitter 40 is commonly called "PLC master". The power line signal transmitter 40 converts the ID number of the electronic equipment 30 and the control signal corresponding to the ID number recognized by the server 22 into a data signal, and interfaces with the power line signal of AC power to transmit the data signal to the power line signal controller 50.

Figure 3:
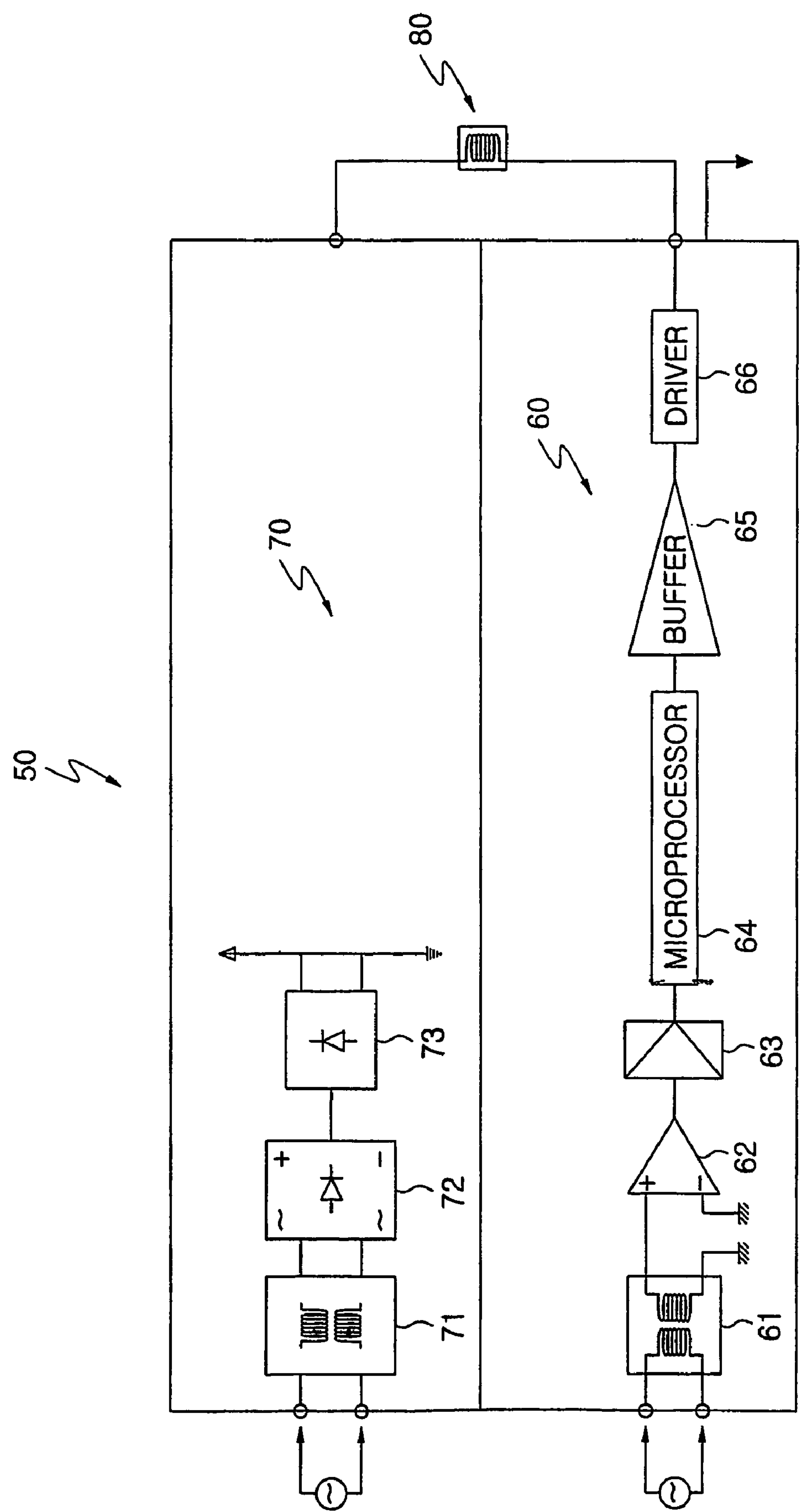
FIG. 3 is a schematic block diagram showing a power line signal controller shown in FIG. 2.

As shown in FIG. 3, the power line signal controller 50 includes a PLC unit 60 for isolating the data signal interfaced with the power line signal by the power line signal transmitter 40 (see FIG. 2) from the power line signal of AC power and converting the data signal into a digital signal, and a driving unit 70 for filtering and rectifying the AC power supplied through a power line and supplying constant voltages of 5V and 24V to the PLC unit 60 and the relay 80 respectively in order to drive the PLC unit 60 and the relay 80.

The PLC unit 60 includes a Low Pass Filter (LPF) 61 for filtering the data signal from the power line signal of AC power interfaced with the data signal and at the same time eliminating power and noise signals to receive only a desired data signal so that noise generation is repressed to the most, an amplifier 62 for amplifying the signal filtered by the LPF 61, an A/D converter 63 for coding the analog signal amplified by the amplifier 62 into a digital signal, a microprocessor 64 for analyzing the ID number of the electronic equipment 30 (see FIG. 2) and the control data signal coded by the A/D converter 63, a buffer 65 for configuring a data path so as to output the ID number and the control data signal analyzed by the microprocessor 64, and a driver 66 for providing the ID number and the control data signal buffered by the buffer to the relay 80 as an on/off pulse signal so that the power source terminal 85 (see FIG. 5) and the load terminal 86 (see FIG. 5) of the relay 80 are selectively connected or disconnected.

The driving unit 70 includes a filter 71 for dropping the AC power applied through the power line to a constant voltage corresponding to a driving power of the PLC unit 60 and the relay 80, a rectifier 72 for rectifying the dropped voltage to be output as DC power, and a regulator 73 for supplying driving powers of 5V and 24V to the PLC unit 60 and the relay 80 respectively by outputting the DC power rectified by the rectifier 72 as a DC signal approximate to a sine wave.

Figure 4:
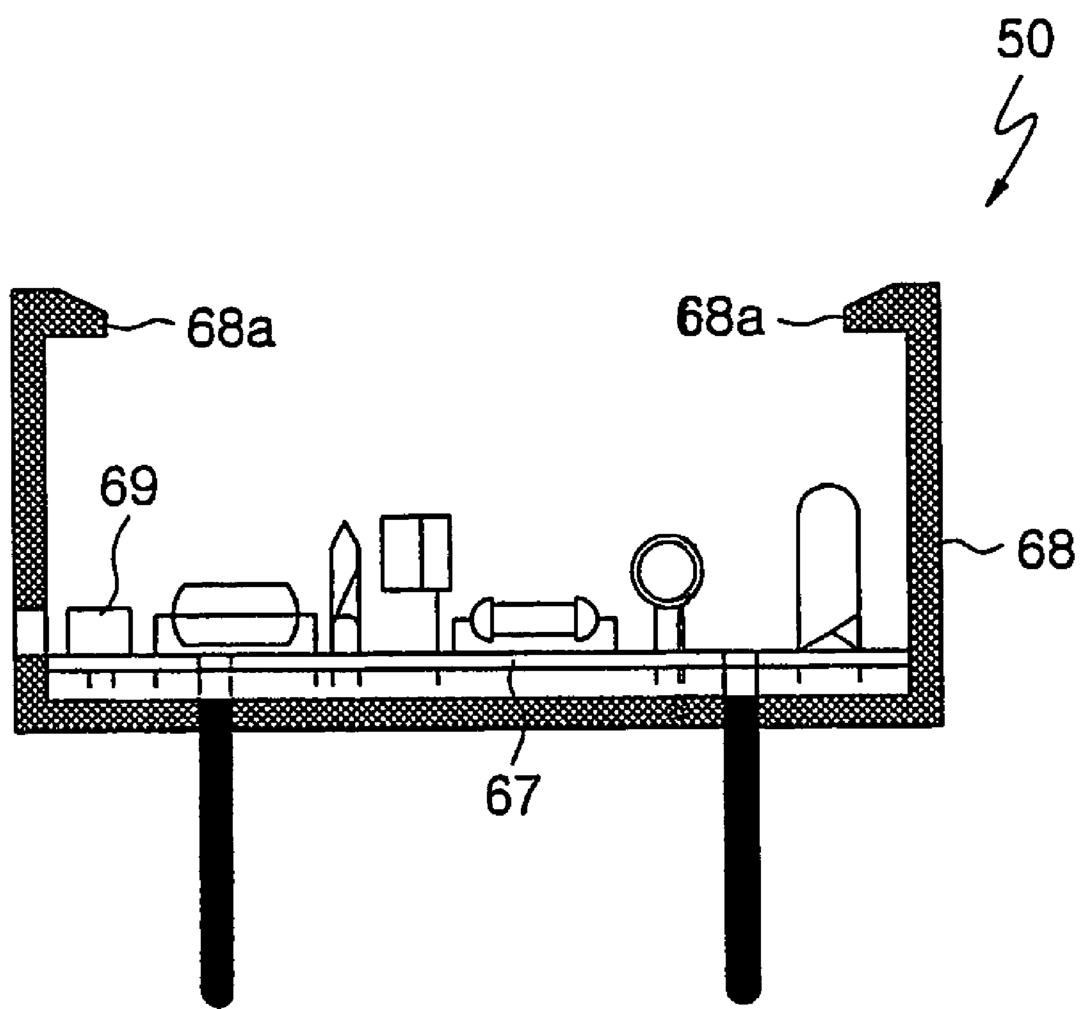
FIG. 4 is a sectional view schematically showing the power line signal controller shown in FIG. 2.

As shown in FIG. 4, the power line signal controller 50 includes a PLC frame 68 with its upper end open so that a circuit board 67 loads the PLC unit 60 (see FIG. 3) and the driving unit 70 (see FIG. 3) as described above. In addition a connector 69 electrically connected to the relay 80 (see FIG. 5) is also provided to the power line signal controller 50. Also, a hooking protrusion 68*a* is formed on the PLC frame 68 so that the PLC frame 68 is selectively detachable from the relay 80 (see FIG. 5).

Figure 5:
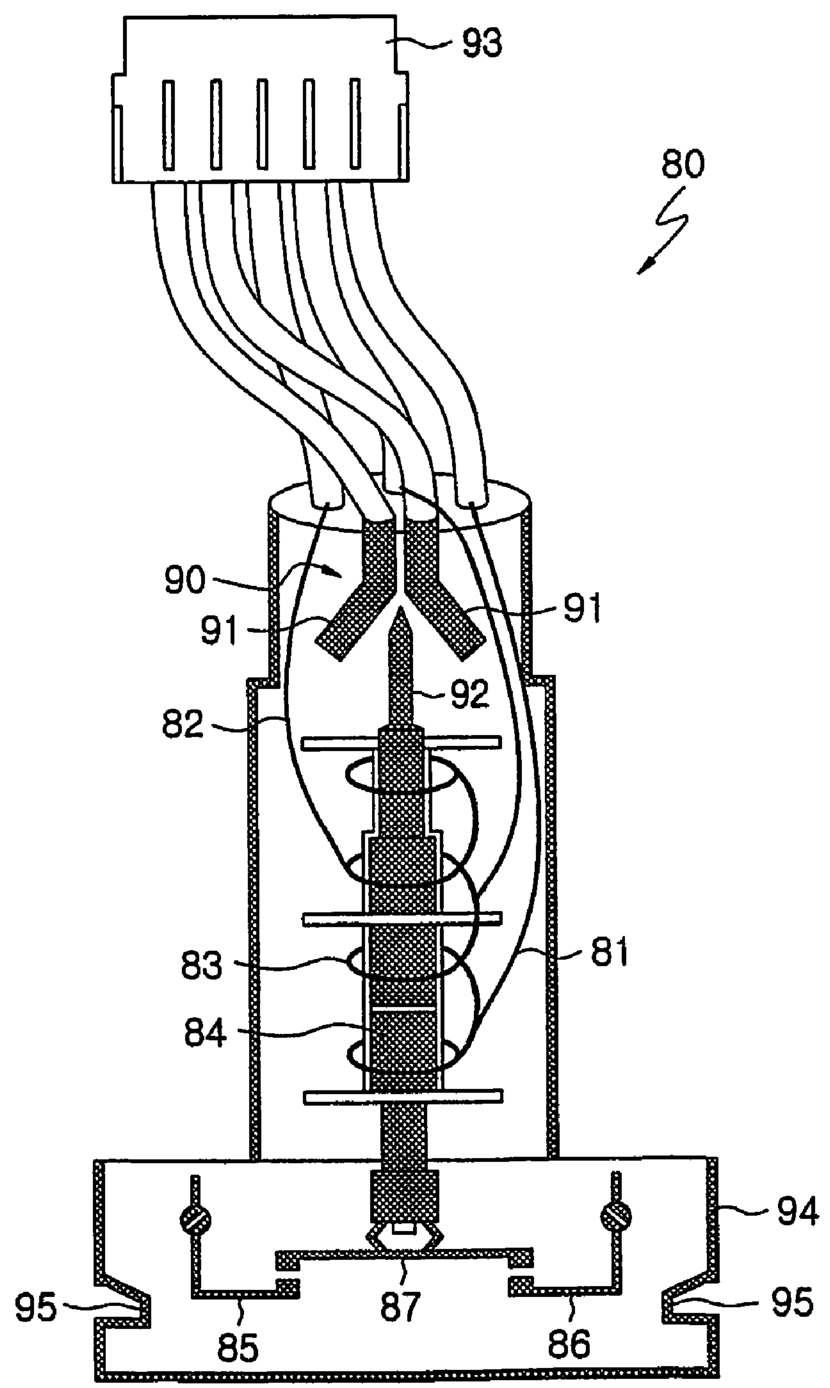
FIG. 5 is a sectional view schematically showing a relay shown in FIG. 2.

As shown in FIG. 5, the relay 80 is commonly called "latching relay" and used for selectively connecting or disconnecting a power source and a load using Fleming's left-hand rule in order to supply or break power toward the electronic equipment. This relay 80 includes a bobbin coil 83 having an open circuit coil 81 for applying a predetermined current upward and a loop circuit coil 82 for applying a predetermined current downward according to the on/off pulse signal provided from the driver 66 of the PLC unit 60 (see FIG. 3). The bobbin coil 83 is spirally wound so that the open circuit coil 81 and the loop circuit coil 82 give electromagnetic forces in opposite directions by the selectively applied current. The relay 80 also includes a bar-shaped mover 84 inserted into the bobbin coil 83 to be movable vertically by the electromagnetic force applied to the bobbin coil 83. In addition, the relay 80 includes an armature 87 installed to the mover 84 so as to selectively connect or disconnect the power source terminal 85 to/from the load terminal 86 by the movement of the mover 84.

The relay 80 may further include a pilot unit 90 selectively contacted with the mover 84 according to the movement of the mover 84 so as to display a connection/disconnection state of the power source terminal 85 and the load terminal 86 to outside so that a user may recognize a drive/stop state of the electronic equipment.

The pilot unit 90 also includes a fixed pilot contactor 91 installed on a path of the mover 84, and a movable pilot contactor 92 installed to the mover 84 in correspondence to the armature 87 so as to selectively contact with the fixed pilot contactor 91 according to the movement of the mover 84.

The pilot unit 90 may use a common switch sensor. If the armature 87 contacts with the power source terminal 85 and the load terminal 86 according to the movement of the mover 84, the pilot unit 90 displays it outside by using such as a LED element that the electronic equipment is operating when the fixed pilot contactor 91 is separated from the movable pilot contactor 92. To the contrary, if the armature 87 is separated from the power source terminal 85 and the load terminal 86 according to the movement of the mover 84, the pilot unit 90 displays it outside by using such as a LED element that the electronic equipment stops when the fixed pilot contactor 91 comes in contact with the movable pilot contactor 92.

Figure 6:
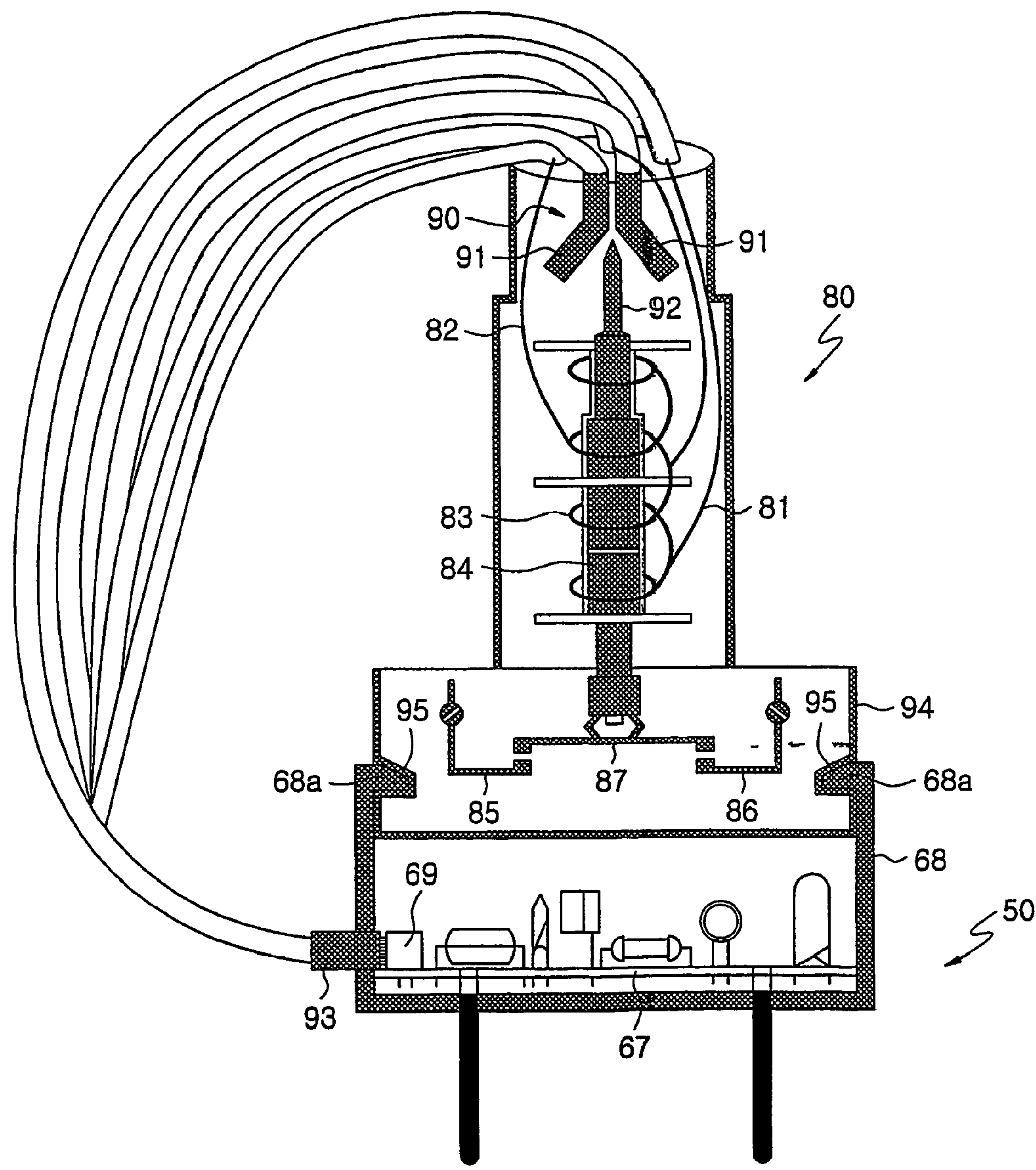
FIG. 6 is a sectional view showing the power line signal controller of FIG. 4 integrally combined with the relay shown in FIG. 5.
Figure 7A:
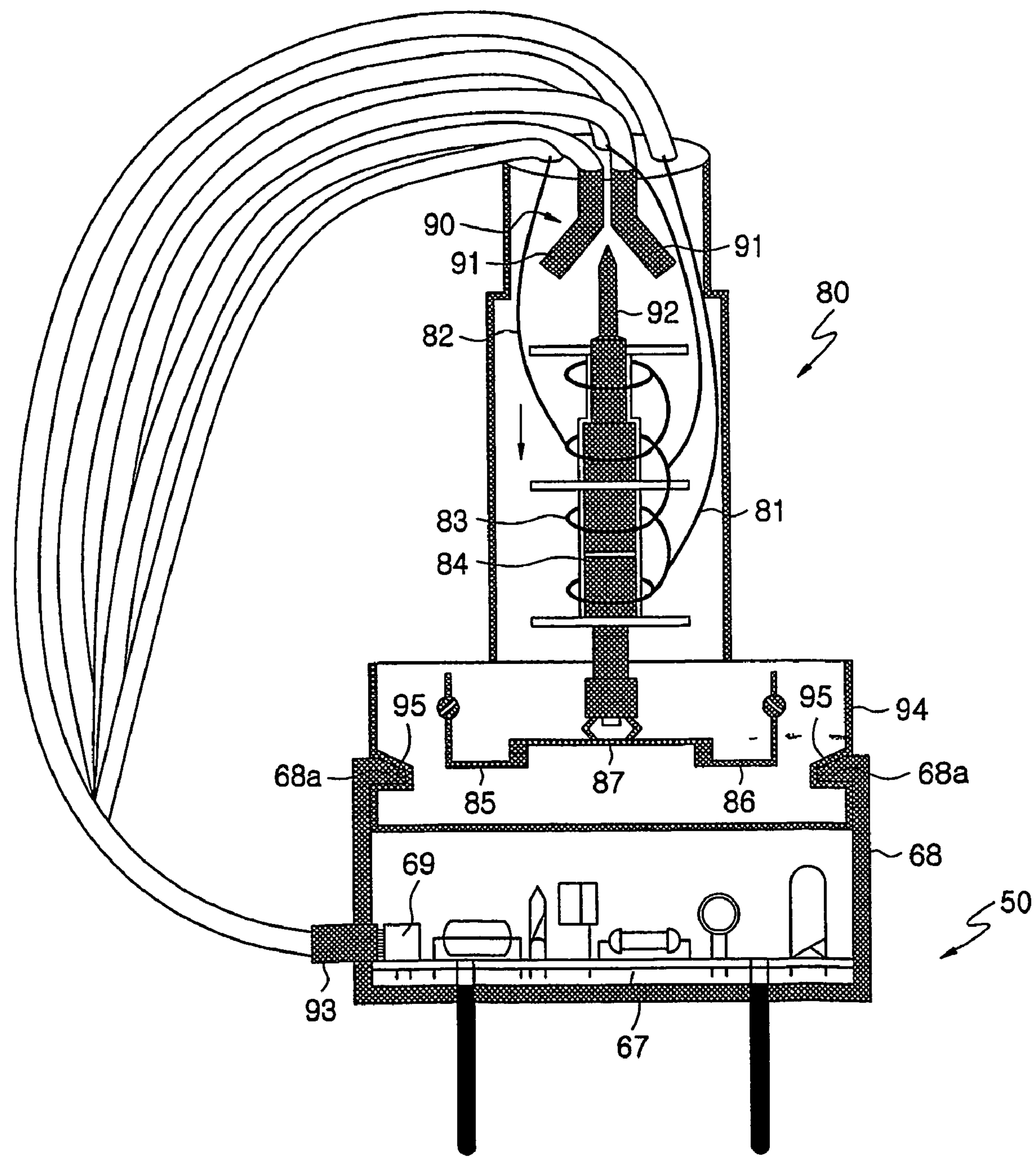
FIGS. 7*a* and 7*b* are sectional views for illustrating the operation of the power supply control system using PLC according to a preferred embodiment of the present invention.
Figure 7B:
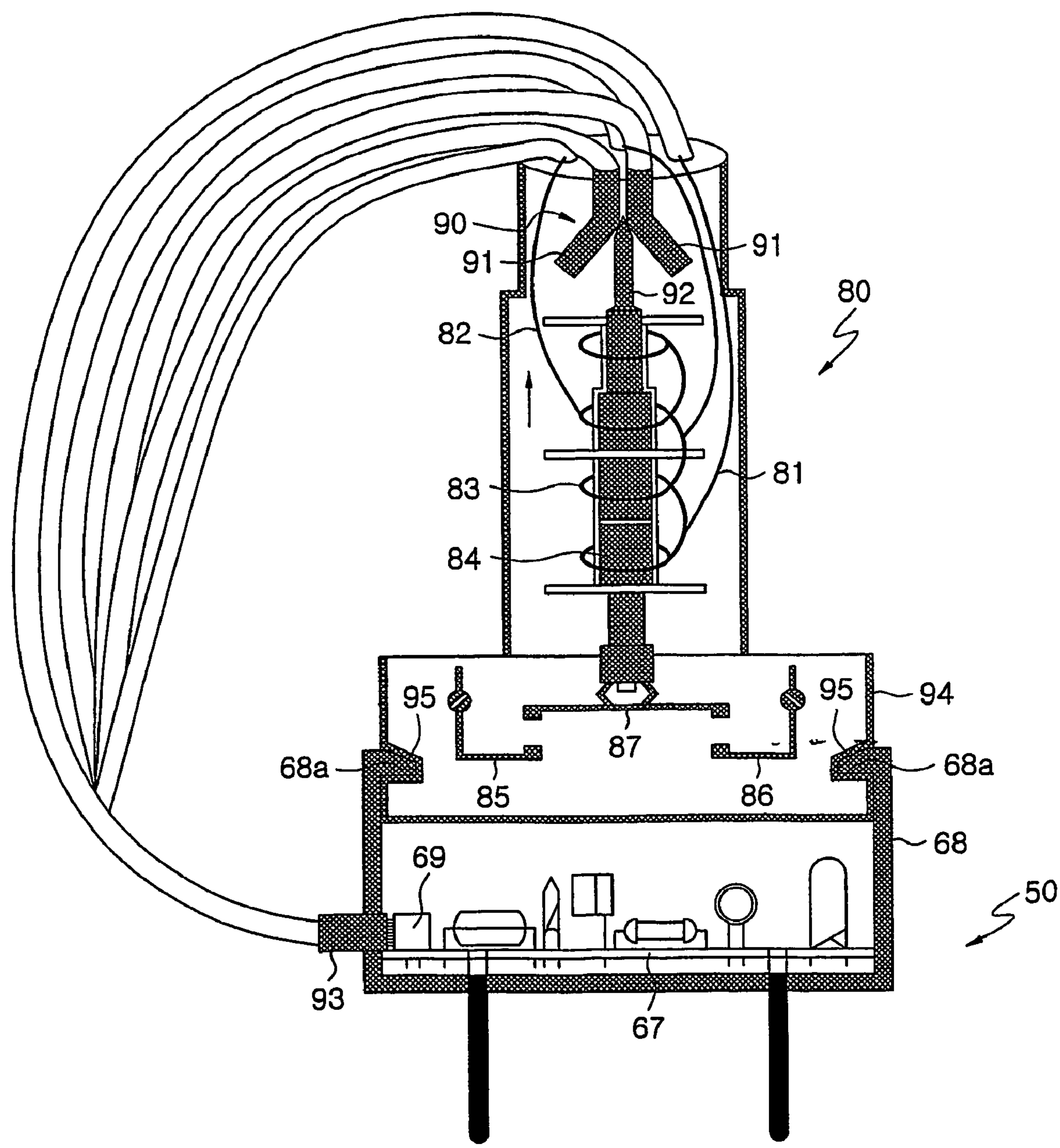

The relay 80 has a connector 93 which is connected to the connector 69 of the power line signal controller 50 so that the open circuit coil 81 and the loop circuit coil 82 are electrically connected to the power line signal controller 50 (see FIG. 6). In addition, the relay 80 has a relay frame 94 to which the bobbin coil 83, the mover 84, the power source terminal 85 and the load terminal 86 are installed. The relay frame 94 is selectively detachable to the PLC frame 68. In this aspect, the relay frame 94 has a hooking groove 95 to which the hooking protrusion 68*a* of the PLC frame 68 may be hooked so that the PLC frame 68 is detachable (see FIG. 6). Thus, as shown in FIG. 6, the power line signal controller 50 and the relay 80 are detachably combined using the male-female engagement.

The power supply control system using PLC constructed as above according to the preferred embodiment of the present invention is operated as follows.

As shown in FIG. 2, in order to supply power to at least one electronic equipment 30 selected from many electronic equipments, the remote control signal transmitter 10 is firstly operated to send an ID number allocated to the selected electronic equipment 30 and a remote control signal for controlling a turn-on operation of the electronic equipment 30 to the receiving terminal 21 of the repeater 20.

The receiving terminal 21 receives the ID number of the electronic equipment 30 and the remote control signal, and then forwards the ID number and the remote control signal to the home automation server 22 through a RS-232 communication port.

After that, the home automation server 22 compares the ID number of at least one electronic equipment 30 received through the receiving terminal 21 with a plurality of preset ID numbers, and then recognizes the control signal for controlling a turn-on operation of the electronic equipment 30 corresponding to the ID number.

Then, the power line signal transmitter 40 converts the ID number of the electronic equipment 30 and the control signal corresponding to the ID number recognized by the server 22 into a data signal, and interfaces with the power line signal of AC power to transmit the data signal to the power line signal controller 50.

After that, as shown in FIG. 3, the PLC unit 60 of the power line signal controller 50 isolates the data signal transmitted from the power line signal transmitter 40 from the power line signal of AC power to convert the data signal into a digital signal, and analyzes the ID number of the electronic equipment and the corresponding data signal to supply an on-pulse signal to the relay 80.

In more detail, the LPF 61 filters the data signal transmitted from the power line signal transmitter 40 from the power line signal of AC power. The amplifier 62 amplifies the signal filtered by the LPF 61. The A/D converter 63 codes an analog signal into a digital signal. The microprocessor 64 analyzes the ID number of the electronic equipment 30 and the data signal coded by the MD converter 63. The driver 66 supplies the ID number and the control data signal buffered by the buffer 65 to the relay 80 as the on-pulse signal so that the power source terminal 85 (see FIG. 5) may be electrically connected to the load terminal 86 (see FIG. 5).

At this time, the driving unit 70 drops a driving power for driving the PLC unit 60 to a constant voltage of AC 5V.

In more detail, the filter 71 drops the AC power applied through the power line to a predetermined constant voltage corresponding to a driving power of the PLC unit 60. The rectifier 72 rectifies the dropped voltage to be output in a DC power. The regulator 73 supplies a driving power of 5V to the PLC unit 60 by outputting the DC power rectified by the rectifier 72 in a DC power approximate to a sine wave.

After that, as shown in FIG. 6, the open circuit coil 81 of the relay 80 receives a current of +24V by the on-pulse signal provided from the power line signal controller 50, while the loop circuit coil 82 receives a current of −24V. In other words, the current applied to the open circuit coil 81 and the loop circuit coil 82 flows upward through the bobbin coil 83. Then, the bobbin coil 83 generates a predetermined electromagnetic force, and the mover 84 moves downward based on Fleming's left-hand rule. As the mover 84 moves downward, the armature 87 contacts with the power source terminal 85 and the load terminal 86, thereby the electronic equipment 30 (see FIG. 2) starts to operate using the applied power.

At this time, the fixed pilot contactor 91 is separated from the movable pilot contactor 92 according to the downward movement of the mover 84, so the pilot unit 90 displays that the electronic equipment is operating.

On the other hand, as shown in FIG. 3, the driving power for driving the relay 80, which is an AC power, is dropped to a constant voltage of 24V by the driving unit 70 before supplied.

In more detail, the filter 71 drops the AC power applied from the power line to a predetermined constant voltage corresponding to the driving power of the relay 80. The rectifier 72 rectifies the dropped voltage and then outputs a DC power. The regulator 73 outputs the DC power rectified by the rectifier 72 as a DC signal approximate to a sine wave to supply a driving power of 24V to the relay 80.

As shown in FIG. 2, in order to break power supplied to at least one electronic equipment 30 selected from many electronic equipments, the remote control signal transmitter 10 is firstly operated to send an ID number allocated to the selected electronic equipment 30 and a remote control signal for controlling a turn-off operation of the electronic equipment 30 to the receiving terminal 21 of the repeater 20.

The receiving terminal 21 receives the ID number of the electronic equipment 30 and the remote control signal, and then forwards the ID number and the remote control signal to the home automation server 22 through a RS-232 communication port.

After that, the home automation server 22 compares the ID number of one or more electronic equipment 30 received through the receiving terminal 21 with a plurality of preset ID numbers, and then recognizes the control signal for controlling a turn-off operation of the electronic equipment 30 corresponding to the ID number.

Then, the power line signal transmitter 40 converts the ID number of the electronic equipment 30 and the control signal corresponding to the ID number recognized by the server 22 into a data signal, and interfaces with the power line signal of AC power to transmit the data signal to the power line signal controller 50.

After that, as shown in FIG. 3, the PLC unit 60 of the power line signal controller 50 isolates the data signal transmitted from the power line signal transmitter 40 from the power line signal of AC power to convert the data signal into a digital signal, and analyzes the ID number of the electronic equipment and the corresponding data signal to supply an off-pulse signal to the relay 80.

In more detail, the LPF 61 filters the data signal transmitted from the power line signal transmitter 40 from the power line signal of AC power. The amplifier 62 amplifies the signal filtered by the LPF 61. The A/D converter 63 codes an analog signal into a digital signal. The microprocessor 64 analyzes the ID number of the electronic equipment 30 and the data signal coded by the A/D converter 63. The driver 66 supplies the ID number and the control data signal buffered by the buffer 65 to the relay 80 as the off-pulse signal so that the power source terminal 85 (see FIG. 5) may be electrically disconnected from the load terminal 86 (see FIG. 5).

After that, as shown in FIG. 6, the open circuit coil 81 of the relay 80 receives a current of −24V by the off-pulse signal provided from the power line signal controller 50, while the loop circuit coil 82 receives a current of +24V. In other words, the current applied to the open circuit coil 81 and the loop circuit coil 82 flows downward through the bobbin coil 83. Then, the bobbin coil 83 generates a predetermined electromagnetic force, and the mover 84 moves upward based on Fleming's left-hand rule. As the mover 84 moves upward, the armature 87 is separated from the power source terminal 85 and the load terminal 86. Therefore, the power source terminal 85 and the load terminal 86 are electrically disconnected, so the power supply to the electronic equipment 30 (see FIG. 2) is broken to stop its operation.

At this time, the fixed pilot contactor 91 comes in contact with the movable pilot contactor 92 according to the upward movement of the mover 84, so the pilot unit 90 displays that the electronic equipment stops its operation.

Terms and words used in the description of the embodiments and the claims should be interpreted just for the explanation purpose, not to limit the scope of the present invention specified in the claims.

INDUSTRIAL APPLICABILITY

As described above in detail, the power supply control system using PLC according to the present invention has a configuration in which the power line signal controller is detachably combined to the relay in electronic equipment. Therefore, the power supply control system of the present invention enables to improve production efficiency of the electronic equipment owing to easy installation and reduce a manufacturing cost.

What is claimed is:

1. A power supply control system using power line communication, comprising:

a repeater means for recognizing a remote control signal transmitted by a predetermined remote control signal transmitting means and an ID number of an electronic equipment corresponding to the remote control signal in order to remotely turn on/off at least one electronic equipment selected among a plurality of electronic equipments;

a power line signal transmitting means for converting the ID number of the electronic equipment and the remote control signal recognized by the repeater means into a predetermined data signal, and interfacing with a power line signal of AC power to transmit the converted data signal;

a power line signal controller having a PLC (Power Line Communication) unit for isolating the data signal transmitted by the power line signal transmitting means from the power line signal of AC power, and converting the data signal into a digital signal; and a relay means integrated with the power line signal controller and included in the electronic equipment so as to control a power source supplied to the electronic equipment by connecting or disconnecting a power source terminal to/from a load terminal under the control of the power line signal controller, the relay means being connected to the PLC unit through a contactor.

2. A power supply control system using power line communication according to claim 1, wherein, the power line signal controller is detachably combined to the relay means by male-female engagement.

3. A power supply control system using power line communication according to claim 1, wherein the power line signal controller further includes a driving unit for filtering and rectifying the AC power supplied through the power line and then supplying constant voltages of 5V and 24V to the PLC unit and the relay means respectively in order to drive the PLC unit and the relay means.

4. A power supply control system using power line communication according to claim 3, wherein the driving unit includes:

a filter for dropping the AC power applied from the power line to a constant voltage corresponding to a driving power of the PLC unit and the relay means;

a rectifier for rectifying the dropped voltage to be output in a DC power; and a regulator for supplying driving powers of 5V and 24V to the PLC unit and the relay means respectively by outputting the DC power rectified by the rectifier as a DC signal approximate to a sine wave.

5. A power supply control system using power line communication according to claim 3, wherein the driving unit includes:

a filter for dropping the AC power applied from the power line to a constant voltage corresponding to a driving power of the PLC unit and the relay means;

a rectifier for rectifying the dropped voltage to be output in a DC power; and a regulator for supplying driving powers of 5V and 24V to the PLC unit and the relay means respectively by outputting the DC power rectified by the rectifier as a DC signal approximate to a sine wave.

6. A power supply control system using power line communication according to claim 1, wherein the PLC unit includes:

a Low Pass Filter (LPF) for filtering the data signal from the power line signal of AC power interfaced with the data signal transmitted from the power line signal transmitting means;

an amplifier for amplifying the signal filtered by the LPF;

an A/D converter for coding the data signal amplified by the amplifier into a digital signal;

a microprocessor for analyzing the ID number of the electronic equipment and the control data signal coded by the A/D converter;

a buffer for configuring a data path so as to output the ID number and the control data signal analyzed by the microprocessor; and a driver for providing the ID number and the control data signal buffered by the buffer as an on/off pulse signal so that the power source terminal and the load terminal of the relay means are selectively connected or disconnected.

7. A power supply control system using power line communication according to claim 6, wherein the relay means includes:

a bobbin coil having an open circuit coil for applying a predetermined current upward and a loop circuit coil for applying a predetermined current downward according to the on/off pulse signal provided from the driver of, the PLC unit, the bobbin coil being spirally wound so that the open circuit coil and the loop circuit coil give electromagnetic forces in opposite directions by the current selectively applied;

a bar-shaped mover inserted into the bobbin coil to be movable vertically by the electromagnetic force applied to the bobbin coil; and an armature installed on the mover so as to connect or disconnect the power source terminal to/from the load terminal by the movement of the mover.

8. A power supply control system using power line communication according to claim 7, wherein the relay means further includes a pilot unit selectively contacted with the mover by the movement of the mover so as to display a connection/disconnection state of the power source terminal and the load terminal.

9. A power supply control system using power line communication according to claim 8, wherein, the pilot unit includes:

a fixed pilot contactor installed on a path of the mover; and a movable pilot contactor installed on the mover in correspondence to the armature so as to selectively contact with the fixed pilot contactor according to the movement of the mover.

10. A power supply control system using power line communication according to claim 6, wherein the relay means includes:

a bobbin coil having an open circuit coil for applying a predetermined current upward and a loop circuit coil for applying a predetermined current downward according to the on/off pulse signal provided from the driver of, the PLC unit, the bobbin coil being spirally wound so that the open circuit coil and the loop circuit coil give electromagnetic forces in opposite directions by the current selectively applied;

a bar-shaped mover inserted into the bobbin coil to be movable vertically by the electromagnetic force applied to the bobbin coil; and an armature installed on the mover so as to connect or disconnect the power source terminal to/from the load terminal by the movement of the mover.

11. A power supply control system using power line communication according to claim 10, wherein the relay means further includes a pilot unit selectively contacted with the mover by the movement of the mover so as to display a connection/disconnection state of the power source terminal and the load terminal.

12. A power supply control system using power line communication according to claim 11, wherein, the pilot unit includes:

a fixed pilot contactor installed on a path of the mover; and a movable pilot contactor installed on the mover in correspondence to the armature so as to selectively contact with the fixed pilot contactor according to the movement of the mover.

* * * * *